United States Patent Office 2,730,537
Patented Jan. 10, 1956

2,730,537
Δ⁴-3-KETO-2-HALO PREGNENES AND PROCESS

Alan H. Nathan and John A. Hogg, Kalamazoo Township, Kalamazoo County, Mich., assignors to The Upjohn Company, Kalamazoo, Mich., a corporation of Michigan No Drawing. Application October 1, 1954,
Serial No. 459,872

20 Claims. (Cl. 260—397.45)

This invention relates to 21-acyloxyprogesterones novel and a process for the production thereof.

It is an object of the present invention to provide a process for the production of 21-acyloxyprogesterones. Another object is the provision of a process for the production of 21-acyloxyprogesterones in higher yield than heretofore attained. Another object is the provision of a process for the production of 21-acyloxyprogesterones from 21-unsubstituted progesterones. Still another object is the provision of a process for the production of 21-acyloxyprogesterones from 21-unsubstituted progesterones without isolation of the intermediate compounds. A further object is the provision of novel 21-acyloxyprogesterones. Other objects will be apparent to those skilled in the art to which this invention pertains.

According to the present invention a 2,21-diglyoxalated progesterone is mono-iodinated at the 21-position; treated with a salt of a lower hydrocarbon carboxylic acid; brominated in the two-position and the glyoxalate group in the two-position removed to produce a 2-bromo-21-acyloxyprogesterone which is dehalogenated to produce a 21-acyloxyprogesterone.

The conversion of certain progesterones to 21-acyloxyprogesterones is known in the art. For example, Reichstein et al., Helv. Chim. Acta, 22, 1212 (1939), converted progesterone to desoxycorticosterone acetate, but only in three percent yield. In our application S. N. 338,881, filed February 25, 1953, now Patent No. 2,683,724, there is disclosed and claimed a process for the conversion of certain 11-oxygenated progesterones to 21-acyloxyprogesterones by monoglyoxalation at the 21-position followed by mono-iodination in the 21-position and treatment with a salt of a lower-aliphatic acid to produce the corresponding 21-acyloxy-11-oxygenated progesterone.

We have now found that the process of the present invention, although involving more steps, gives higher yields of 21-acyloxyprogesterone than the processes heretofore known. Moreover, the process of the present invention is capable of being performed without isolation of the intermediate reaction products. Under these conditions only one reaction vessel is required, thus facilitating the operation of the process on a large scale.

The conversion of a progesterone to a 21-acyloxyprogesterone according to the process of the present invention may be represented in the following manner:

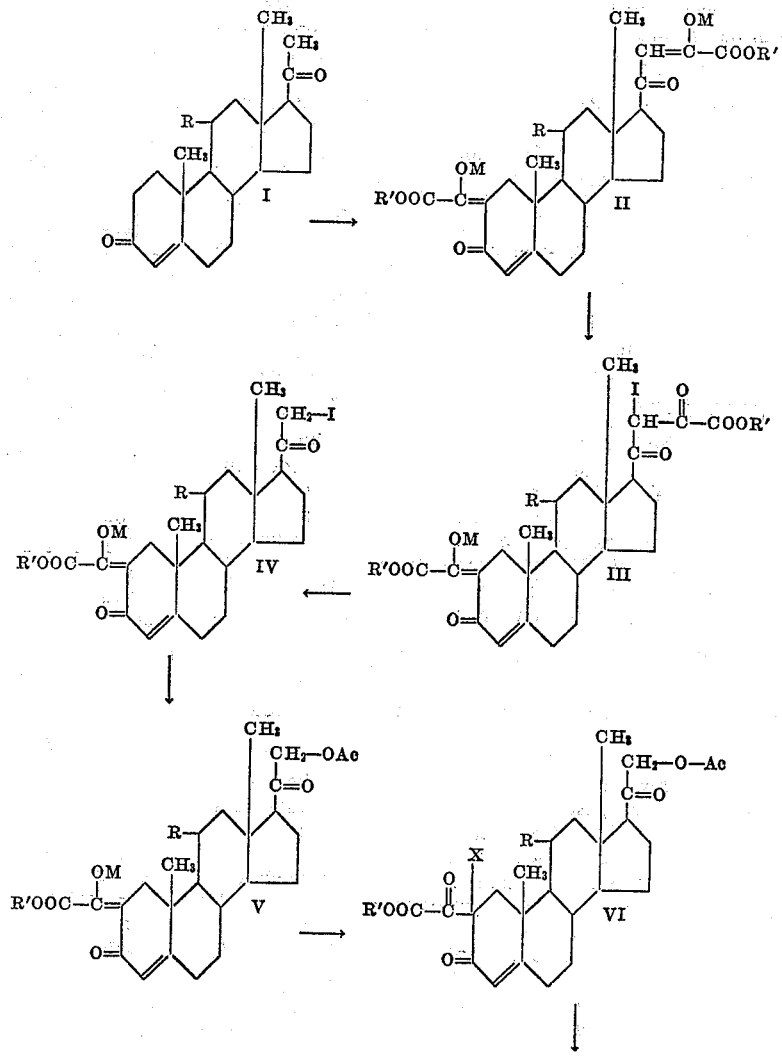

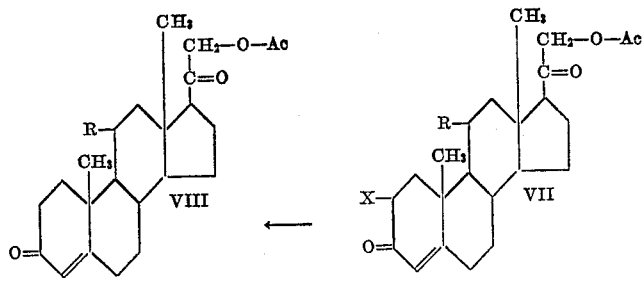

wherein R is hydrogen, an α-hydroxy group, a β-hydroxy group, an α-acyloxy group, or a ketonic oxygen (=O); wherein M is hydrogen or an alkali metal; wherein R' is lower alkyl; wherein X is chlorine or bromine; and wherein Ac is the acyl radical of an organic carboxylic acid.

The 21-acyloxyprogesterones produced according to the process of the present invention are adrenal cortical hormones or readily convertible thereto. For example, a 21-acyloxyprogesterone represented by Formula VIII, wherein R is hydrogen, is a physiologically active ester of 11-desoxycorticosterone. When R is a β-hydroxy group, the compound is an ester of corticosterone; when R is keto, the compound is an ester of dehydrocorticosterone; and when R is α-hydroxy, the compound is an ester of 11-epicorticosterone which is readily oxidized with chromic acid to an ester of dehydrocorticosterone.

The 2,21-diglyoxalated progesterones which are iodinated according to the process of the present invention, can be prepared by the reaction of a progesterone represented by Formula I with at least two molar equivalents of a dialkyl oxalate and an alkali-metal base, under substantially anhydrous conditions, as disclosed hereinafter and as disclosed and claimed in our copending application S. N. 346,274, filed April 1, 1953. Under these conditions the compound is produced as an alkali-metal dienolate (II, M=alkali-metal). This compound, or the free enol (II, M=H) is then monoiodinated with iodine to produce the 2,21-diglyoxalated-21-monoiodoprogesterone represented by Formula III. This compound, when treated with a base and preferably also water or an alkanol, is readily converted to the 2-glyoxalated-21-iodoprogesterone represented by Formula IV. Treatment of this 21-iodo compound with an alkali-metal salt of an organic carboxylic acid is productive of a 2-glyoxalated-21-acyloxyprogesterone represented by Formula V. Halogenation of this compound with about a molar equivalent of chlorine or bromine is productive of the 2-halo-2-glyoxalated-21-acyloxyprogesterone represented by Formula VI. Treatment of this latter compound with a base and water or an alkanol is productive of the 2-halo-21-acyloxyprogesterone represented by Formula VII which, when dehalogenated, is productive of a 21-acyloxyprogesterone represented by Formula VIII.

In the conversion of a progesterone represented by Formula I to a 21-acyloxyprogesterone represented by Formula VIII, the following reactions are involved:

DIGLYOXALATION

In carrying out the diglyoxalation step of the present invention, a progesterone represented by Formula I is mixed with at least two molar equivalents each of an alkyl diester of oxalic acid and an alkali-metal base condensing agent, under substantially anhydrous conditions, to produce a 2,21-dialkoxyoxalylprogesterone alkali-metal enolate represented by Formula II. This step is usually performed in a solvent such as, for example, benzene, methanol, ethanol, tertiary butyl alcohol, tetrahydrofuran, furan, ether, Skellysolve B hydrocarbons, or mixtures of these or other essentially non-active solvents. Benzene, or an alkanol, especially tertiary butyl alcohol, are usually the preferred solvents.

A reaction temperature between about twenty and about eighty degrees centigrade is the preferred reaction temperature for the first step of the present invention, although temperatures between about zero degrees centigrade and the boiling point of the reaction mixture can be used. Reaction times may vary from less than one-half hour to several days, depending upon the solvent, the reaction temperature, the starting reactants, the amount of moisture present in the reaction, and the molar ratio of reactants employed. When sodium methoxide or ethoxide and methyl or ethyl oxalate are employed, the reaction is usually essentially complete in about four hours or less. The reaction is preferably carried out in the absence of significant amounts of water or large amounts of added methyl or ethyl alcohol, any of which tend to reduce the yield of desired product.

Alkali-metal base condensation agents which may be used include the preferred alkali-metal alkoxides, e. g., sodium methoxide, sodium ethoxide, potassium tertiary butoxide, lithium methoxide, and the like, the alkali metals, the alkali-metal hydrides and the alkyl alkali metals, e. g., sodium hydride, sodium amide, triphenyl methyl sodium, potassium tertiary butoxide, and the like. Of these, sodium methoxide and sodium ethoxide are preferred for their convenience and consistently satisfactory results. An alkali-metal alkoxide may be used solvent-free, dissolved or suspended in a non-reactive solvent, or in situ in the alkanol in which said alkali-metal alkoxide was prepared. When potassium is used, it is suitably used as the solution formed by its reaction with tertiary butyl alcohol according to procedure well known in the art.

The thus-produced diglyoxalated product may then be isolated by precipitation or other procedures or used directly without isolation in the next step of the process. Usually it is unnecessary to isolate or purify the thus-glyoxalated product unless the 2,21-dialkoxyoxalyl steroid is preferred as an isolated product. Isolation for purification or other purposes is, however, conveniently achieved if desired by the addition to the mixture of a solvent in which the alkali-metal enolate is insoluble or by the addition of aqueous acid, if the free enol is the desired product, and then isolating the free enol by conventional procedure.

IODINATION

The iodination step of the process of the present invention involves reaction of the steroid condensation product (II) with about one molar equivalent of iodine. This step may be performed by employing the crude or unisolated total reaction product produced from the first step of the present invention, the free enol produced by the acidification of the crude reaction product, or the isolated free enol or alkali-metal enolate. This iodination may be performed under somewhat alkaline, acidic or essentially neutral conditions. However, the reaction is preferably conducted on the free enol in the presence of a base capable of absorbing the hydrogen iodide formed during the iodination.

A preferred procedure for the iodination of the diglyoxalated progesterone comprises the addition, prior to the iodination, of an aliphatic carboxylic acid to the mixture in an amount chemically equivalent to the alkali-metal base present in the starting mixture. The iodination step, under such conditions of operation, is presumably performed on the free enol form of the condensation product (II, M=H). Representative acids which may be used for this purpose include formic, acetic, propionic, butyric, octanoic or like acid, with acetic acid being preferred.

The iodination step results in the production of one mole of hydrogen iodide per mole of starting steroid, which hydrogen iodide will remain in the reaction mixture if no base is present to react therewith. The presence of this hydrogen iodide in the reaction mixture appears to be somewhat undesirable and therefore is preferably neutralized in situ as it is formed by a chemical equivalent or greater amount of a suitable base in the reaction mixture during the halogenation step. Suitable bases are of sufficient strength to react with the hydrogen iodide but preferably do not react to any appreciable extent with the steroidal product of the iodination to produce an undesirable by-product. Such bases include, for example, alkali-metal salts of aliphatic carboxylic acids, potassium octanoate, potassium acetate, amines, urea, aluminum hydroxide, triphenylamine, and the like. The alkali-metal salts of this aliphatic carboxylic acid appear to be the most desirable and, of these, sodium acetate and potassium acetate are preferred.

Solvents commonly employed for iodinations may be used in the iodination step, e. g., acetic acid buffered with potassium acetate, methanol, chloroform, and the like. When all of the steps of the present process are carried out without the isolation of the intermediately produced compounds, tertiary butyl alcohol is the preferred solvent, for all of the reactions of the present process can be carried out in this solvent, although other solvents may also serve for these reactions. The iodination is preferably carried out at below or about room temperature, e. g., between about minus five and plus 25 degrees centigrade, although temperatures as low as minus thirty degrees centigrade and as high as seventy degrees centigrade can be employed. The thus-iodinated product is usually used without isolation or purification in the next step of the process. The iodinated product may, however, be isolated by addition of a large volume of water to the reaction mixture, thus precipitating the iodinated steroid.

ACYLATION

The acylation step of the present invention involves the treatment of the iodinated diglyoxalated progesterone (III) with an alkali-metal salt of an organic carboxylic acid, preferably of a lower-aliphatic acid, especially acetic acid. The acylation reaction is performed under conditions normally employed in such a reaction, e. g., mixing the iodinated steroid with the selected alkali-metal salt of an organic carboxylic acid, for example, at about room temperature, for several hours. If an alkanol, especially methanol or ethanol, is present in the reaction mixture during the acylation step, the addition of an alkali-metal salt of an organic carboxylic acid will first result in the reversal of the glyoxalation to produce a monoglyoxalted iodinated progesterone which may be represented by Formula IV.

In this regard, we have noted that, whereas the alkoxyoxalyl group of a glyoxalated steroid is removed, in the presence of a base, usually with difficulty, halogenation of the glyoxalated steroid alpha to the alkoxyoxalyl group promotes the removal, in the presence of a base, of the alkoxyoxalyl group. Thus, treatment of a 2,21-diglyoxalated-21-iodoprogesterone (III) with potassium acetate in the presence of methanol results in the production of a steroid wherein the 21-alkoxyoxalyl group has been removed but the 2-alkoxyoxalyl group is substantially unaffected.

As known in the art, an acylation reaction of this type can be conducted under a variety of conditions, e. g., from zero degrees centigrade to about 100 degrees centigrade, but the preferred conditions involve the use of a large excess of potassium or sodium salt of a lower-aliphatic acid, preferably acetic acid, at about room temperature for about 24 hours, although the reaction may be complete in a much shorter time.

HALOGENATION

The halogenation step of the process of the present invention involves the reaction of the acylated product (V) with about one molar equivalent of a halogen having an atomic weight from 35 to eighty, inclusive, i. e., chlorine or bromine, but not substantially exceeding that amount required to maintain free halogen in the reaction mixture. There is thus produced a 2-alkoxyoxalyl-2-halo-21-acyloxyprogesterone represented by Formula VI. This compound ordinarily is not isolated. Under alkaline conditions, it is readily converted to a 2-halo-21-acyloxyprogesterone represented by Formula VII. If the halogenation is conducted under alkaline conditions, no hydrogen halide will be produced in the halogenation. Under the preferred conditions, the halogenation is conducted in an alkanol and in the presence of potassium acetate. Under these conditions the potassium acetate destroys the hydrogen halide as it is formed. If, however, the halogenation is conducted under acidic conditions, hydrogen halide is produced in the halogenation. The thus-produced hydrogen halide is detrimental in the reaction mixture and should be destroyed immediately.

Conversion of the thus-produced 2-alkoxyoxalyl-2-halo-21-acyloxyprogesterone (VI) to a 2-halo-21-acyloxyprogesterone (VII) is preferably accomplished with a strong base, e. g., an alkali-metal alkoxide, preferably sodium ethoxide or methoxide, although any of the bases suggested in the iodination step may be employed. These 2-halo-21-acyloxyprogesterones are stable compounds which can be isolated and/or purified, e. g., by chromatography over a column of Florisil synthetic magnesium silicate.

DEHALOGENATION

The dehalogenation step of the present invention, i. e., the reaction of the 2-halogenated 21-acyloxyprogesterone produced in the halogenation step with a dehalogenating agent, converts the 2-halogenated steroid to a 21-acyloxyprogesterone represented by Formula VIII.

Although the number of molar equivalents each of zinc and acetic acid or other dehalogenation agent employed may theoretically be as little as one molar equivalent, calculated on the 2-halogenated steroid, a large molar excess of dehalogenation agent is preferably employed. A substantial molar excess of the dehalogenating agent is added to the solution of the halogenated steroid and the resulting mixture stirred, preferably at room temperature or higher temperature, for several minutes to several hours. The resulting steroid material may be isolated by filtering any undissolved inorganic material and then precipitating the steroid material from the filtrate by distilling the solvent therefrom or by adding a large volume of water to the resulting filtrate. The thus-produced acyloxyprogesterone (VIII) may then be purified in a conventional manner, such as, for example, by fractional crystallization or chromatography. A product of high purity is readily obtained by chromatography of the reaction product over Florisil magnesium silicate or alumina.

Other representative dehalogenating agents which can be used in the dehalogenation step include sodium iodide and acetone or an alkanol, chromyl chloride, deactivated Raney nickel, and the like. Usually, to obtain optimum yields of dehalogenated products, a large molar excess of dehalogenating agent is employed and the reaction is conducted at about room temperature although some-

7 what higher or lower temperature produces satisfactory results.

The following examples are illustrative of the process and products of the present invention but are not to be construed as limiting.

Example 1.—11-keto-21-acetoxyprogesterone

To a solution of 6.57 grams (0.02 mole) of 11-ketoprogesterone in 100 milliliters of tertiary butyl alcohol was added, at seventy degrees centigrade, in an atmosphere of nitrogen and with stirring, 11.7 grams (0.08 mole) of ethyl oxalate. The temperature was permitted to drop to 55 degrees and 2.70 grams (0.05 mole) of sodium methoxide in twelve milliliters of dry methanol was added. The resulting pasty yellow suspension was stirred for fifteen minutes in an atmosphere of nitrogen.

A cooled solution of three grams (0.05 mole) of acetic acid in 160 milliliters of methanol was added to the suspension of the thus-produced sodium dienolate of 2,21-diethoxyoxalyl-11-keto-progesterone to produce a solution of the free enol in the presence of an excess of sodium acetate. A solution of 5.1 grams (0.02 mole) of iodine in 100 milliliters of methanol was added. The solution was maintained at room temperature for two and one-half hours while stirring was continued under nitrogen.

To the resulting solution of 2,21-diethoxyoxalyl-11-keto-21-iodoprogesterone was added 39 grams of anhydrous potassium acetate and the solution was kept at room temperature for 24 hours. There was thus-produced a solution of 2-ethoxyoxalyl-11-keto-21-acetoxyprogesterone, resulting from the acetylation of the intermediately produced 2-ethoxyoxalyl-11-keto-21-iodoprogesterone.

The solution of 2-ethoxyoxalyl-11-keto-21-acetoxyprogesterone was poured into 1,500 milliliters of ice water containing 4.5 grams of sodium thiosulfate and forty milliliters of 5 N sulfuric acid. The precipitated yellow crude 2-ethoxyoxalyl-11-keto-21-acetoxyprogesterone was filtered, washed with water and dried. There was thus-obtained 7.64 grams of crude product which gave a negative Beilstein test for halogen and a positive ferric chloride test for enols. Its infrared absorption spectrum was consistent with the structure, V, R=O.

The thus-isolated 2-ethoxyoxalyl-11-keto-21-acetoxyprogesterone was dissolved in 120 milliliters of methanol containing five grams of anhydrous sodium acetate. To the resulting deep red-brown solution cooled to about zero degrees centigrade, there was then slowly added a solution of 2.5 grams (0.0156 mole) of bromine in 25 milliliters of methanol. This solution containing 2-bromo-2-ethoxyoxalyl-11-keto-21-acetoxyprogesterone was then mixed with a solution of 0.845 gram (0.155 mole) of sodium methoxide in 3.45 milliliters of methanol and was stirred for one hour as the temperature of the solution was permitted to rise to room temperature.

The thus-produced reaction product containing 2-bromo-11-keto-21-acetoxyprogesterone was mixed with eight milliliters of glacial acetic acid and 3.5 grams of zinc dust for one hour with vigorous stirring to produce 11-keto-21-acetoxyprogesterone. The resulting solution was filtered and the steroid in the filtrate precipitated by pouring it into 800 milliliters of ice water. The white amorphous precipitate was filtered and dried to yield 5.21 grams of crude 11-keto-21-acetoxyprogesterone which was chromatographed over 270 grams of Florisil magnesium silicate. The column was developed with ten fractions of Skellysolve B hexane hydrocarbons containing ten percent acetone and ten fractions of Skellysolve B containing twenty percent acetone. The eluate fractions containing twenty percent acetone were combined and the solvent distilled to leave 2.79 grams, a yield of 36 percent calculated on the starting 11-keto-

8 progesterone, of 11-keto-21-acetoxyprogesterone melting at 178 to 180 degrees centigrade.

In the same manner, progesterone, 11α-hydroxyprogesterone, 11β-hydroxyprogesterone and 11α-acetoxyprogesterone are similarly converted, when carried through the reactions described above, to 21-acetoxyprogesterone, 11α-hydroxy-21-acetoxyprogesterone, 11β-hydroxy-21-acetoxyprogesterone and 11α,21-diacetoxyprogesterone, respectively. Substituting other alkali-metal salts of hydrocarbon carboxylic acids containing from one to eight carbon atoms, inclusive, e. g., potassium formate, sodium propionate, sodium butyrate, sodium dimethylacetate, potassium phenylacetate, sodium benzoate, potassium β-cyclopentylpropionate, sodium phenylpropionate, potassium trimethylacetate, etc., for the potassium acetate employed immediately after the iodination, is productive of other 21-acyloxyprogesterones, e. g., 21-formoxyprogesterone, 21-(β-cyclopentylpropionyloxy)progesterone, 11β - hydroxy - 21-phenylacetoxyprogesterone, etc.

Example 2.—2-bromo-11-keto-21-acetoxyprogesterone

To a solution of 0.01 mole of 2-ethoxyoxalyl-21-acetoxy-11-ketoprogesterone in methanol was added a molar equivalent of bromine in methanol at about zero degrees centigrade. There was thus-produced a solution of 2-bromo - 2 - ethoxyoxalyl - 21 - acetoxy - 11 - ketoprogesterone. To this solution was added a molar equivalent of sodium methoxide in methanol and the mixture was stirred at room temperature for one hour. The resulting solution was then poured into water, the steroidal precipitate filtered, dried and chromatographed over 270 grams Florisil magnesium silicate which was developed with ten 400 milliliter fractions of Skellysolve B hexane hydrocarbons containing ten percent acetone and the ten 400 milliliter fractions of Skellysolve B containing twenty percent acetone. The eluates containing twenty percent acetone contained the 2-bromo-11-keto-21-acetoxyprogesterone which, after one crystallization from methanol, melted with blackening at 161 to 162 degrees centigrade. Its infrared absorption spectrum was consistent with the structure.

*Anal.*—Calc. for $C_{23}H_{29}BrO_5$: C 59.36; H, 6.28; Br 17.17. Found: C 59.69; H, 6.63; Br 16.84.

$\alpha_D +241°$ (c. 0.9 chf.)

Substituting chlorine for bromine in the halogenation described above is productive of 2-chloro-11-keto-21-acetoxyprogesterone.

Example 3.—2-bromo-21-acetoxyprogesterone

Substituting 2-ethoxyoxalyl-21-acetoxyprogesterone or other 2-alkoxyoxalyl-21-acetoxyprogesterone as the starting steroid in the reactions described in Example 2 is productive of 2-bromo-21-acetoxyprogesterone. Substituting chlorine for bromine in the halogenation step is productive of 2-chloro-21-acetoxyprogesterone.

Example 4.—2-bromo-11α-hydroxy-21-acetoxyprogesterone

Substituting 2-ethoxyoxalyl-11α-hydroxy-21-acetoxyprogesterone or other 2-alkoxyoxalyl-11α-hydroxyprogesterone as the starting steroid in the reactions described in Example 2 is productive of 2-bromo-11α-hydroxy-21-acetoxyprogesterone. Substituting chlorine for bromine in the halogenation step is productive of 2-chloro-11α-hydroxy-21-acetoxyprogesterone.

Example 5.—2-bromo-11β-hydroxy-21-acetoxyprogesterone

Substituting 2-ethoxyoxalyl-11β-hydroxy-21-acetoxyprogesterone or other 2-alkoxyoxalyl-11β-hydroxy-21-acetoxyprogesterone as the starting steroid in the reactions described in Example 2 is productive of 2-bromo-11β - hydroxy - 21 - acetoxyprogesterone. Substituting chlorine for bromine in the halogenation step is productive of 2-chloro-11β-hydroxy-21-acetoxyprogesterone.

Example 6.—2-bromo-11α,21-diacetoxyprogesterone

Substituting 2-ethoxyoxalyl-11α,21-diacetoxyprogesterone, or other 2-alkoxyoxalyl-11α,21-diacetoxyprogesterone as the starting steroid in the reactions described in Example 2 is productive of 2-bromo-11α,21-diacetoxyprogesterone. Substituting chlorine for bromine in the halogenation step is productive of 2-chloro-11α,21-diacetoxyprogesterone.

Other 21-acyloxy variants of the compounds described in Examples 1 to 5 are produced by starting with other selected 2-alkoxyoxalyl-21-acyloxyprogesterones having as the 11-substituent: hydrogen atoms, an α- or β-hydroxy group, an α-acyloxy group or a ketonic oxygen (=O), wherein the alkoxy group is lower-alkoxy and the acyloxy group is lower acyloxy.

It is to be understood that the invention is not to be limited to the exact details of operation or exact compounds shown and described, as obvious modifications and equivalents will be apparent to one skilled in the art, and the invention is to be limited only to the scope of the appended claims.

We claim:

1. 2-halosteroids represented by the following formula:

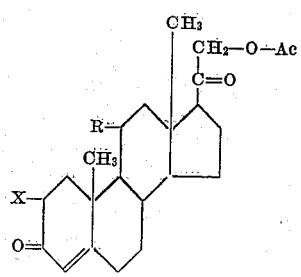

wherein R is selected from the group consisting of hydrogen, α-hydroxy, β-hydroxy, ketonic oxygen and Ac—O—, wherein Ac in each instance represents the acyl radical of a hydrocarbon carboxylic acid containing from one to eight carbon atoms, inclusive, and wherein X is a halogen having an atomic weight from 35 to eighty, inclusive.

2. 2-bromo-21-acyloxyprogesterone represented by the following formula:

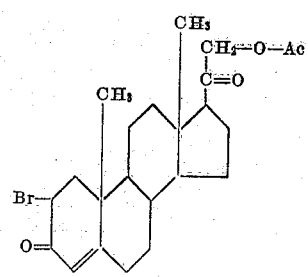

wherein Ac is the acyl radical of a hydrocarbon carboxylic acid containing from one to eight carbon atoms, inclusive.

3. 2-bromo-11-hydroxy-21-acyloxyprogesterone represented by the following formula:

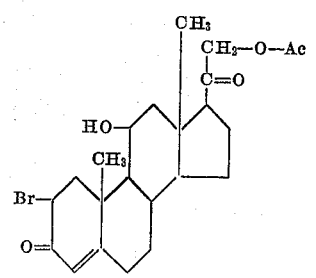

wherein Ac is the acyl radical of a hydrocarbon carboxylic acid containing from one to eight carbon atoms, inclusive.

4. 2-bromo-11-keto-21-acyloxyprogesterone represented by the following formula:

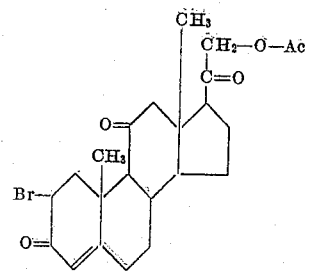

wherein Ac is the acyl radical of a hydrocarbon carboxylic acid containing from one to eight carbon atoms, inclusive.

5. 2-bromo-21-acetoxyprogesterone.
6. 2-bromo-11-keto-21-acetoxyprogesterone.
7. 2-bromo-11β-hydroxy-21-acetoxyprogesterone.
8. 2-bromo-11α-hydroxy-21-acetoxyprogesterone.

9. A process for the production of 2-halo-21-acyloxyprogesterone which comprises halogenating with a halogen having a molecular weight from 35 to eighty, inclusive, a 2-alkoxyoxalyl-21-acyloxyprogesterone represented by the following formula:

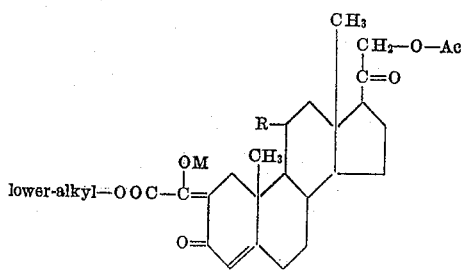

wherein M is selected from the group consisting of hydrogen and alkali metal, wherein R is selected from the group consisting of hydrogen, α-hydroxy, β-hydroxy, ketonic oxygen and Ac—O—, wherein each instance Ac represents the acyl radical of a hydrocarbon carboxylic acid, followed by removal of the alkoxyoxalyl group with base, to produce a 2-halo-21-acyloxyprogesterone represented by the following formula:

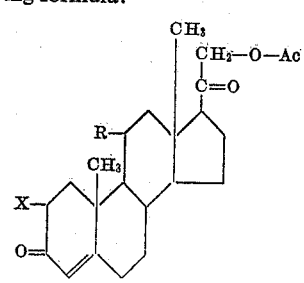

10. A process for the production of 2-bromo-21-acyloxyprogesterone which comprises brominating with bromine a 2-alkoxyoxalyl-21-acyloxyprogesterone represented by the following formula:

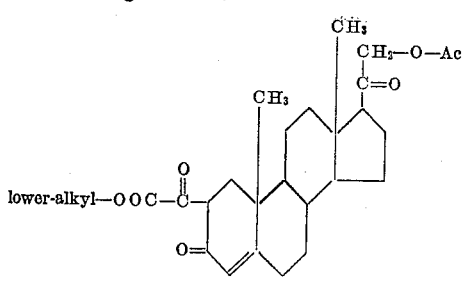

wherein Ac represents the acyl radical of a hydrocarbon carboxylic acid, followed by removal of the alkoxyoxalyl group with base, to produce 2-bromo-21-acyloxyprogesterone.

11. The process of claim 10 wherein Ac is acetoxy.

12. A process for the production of 2-bromo-11-hydroxy-21-acyloxyprogesterone which comprises brominating with bromine a 2-alkoxyoxalyl-11-hydroxy-21-acyloxyprogesterone represented by the following formula:

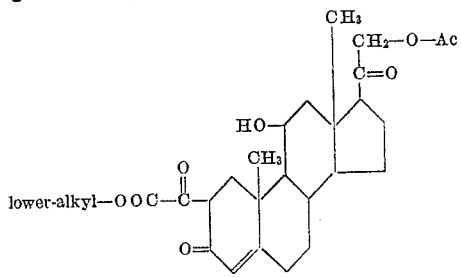

wherein Ac represents the acyl radical of a hydrocarbon carboxylic acid, followed by removal of the alkoxyoxalyl group with base to produce 2-bromo-11-hydroxy-21-acyloxyprogesterone.

13. The process of claim 12 wherein Ac is acetoxy.

14. A process for the production of 2-bromo-11-keto-21-acyloxyprogesterone which comprises brominating with bromine a 2-alkoxyoxalyl-11-keto-21-acyloxyprogesterone represented by the following formula:

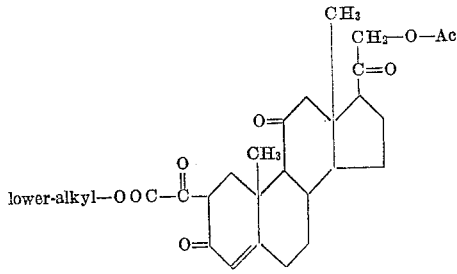

wherein Ac represents the acyl radical of a hydrocarbon carboxylic acid, followed by removal of the alkoxyoxalyl group with base to produce 2-bromo-11-keto-21-acetoxyprogesterone.

15. The process of claim 14 wherein Ac is acetoxy.

16. The process which comprises the steps of (1) diglyoxalating, under substantially anhydrous conditions with at least two molar equivalents each of an alkali-metal base condensing agent and a dialkyl ester of oxalic acid, a progesterone represented by the following formula:

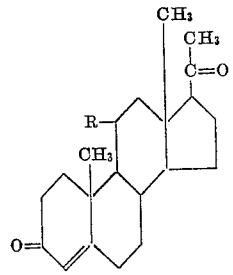

wherein R is selected from the group consisting of hydrogen, α-hydroxy, β-hydroxy, α-acyloxy and ketonic oxygen, to produce a dialkali metal enolate of a 2,21-dialkoxyoxalylprogesterone, (2) iodinating with a molar equivalent of iodine to produce a 2,21-dialkoxyoxalyl-21-iodoprogesterone, (3) contacting the 2,21-dialkoxyoxalyl-21-iodoprogesterone with base to produce 2-alkoxyoxalyl-21-iodoprogesterone, (4) contacting the 2-alkoxyoxalyl-21-iodoprogesterone with an alkali-metal salt of a hydrocarbon carboxylic acid to produce a 2-alkoxyoxalyl-21-acyloxyprogesterone, (5) halogenating with a halogen having an atomic weight from 35 to eighty, inclusive, to produce a 2-halo-2-alkoxyoxalyl-21-acyloxyprogesterone, (6) contacting with a base to produce a 2-halo-21-acyloxyprogesterone, and (7) dehalogenating the thus-produced 2-halo-21-acyloxyprogesterone with a dehalogenating agent to produce a 21-acyloxyprogesterone represented by the following formula:

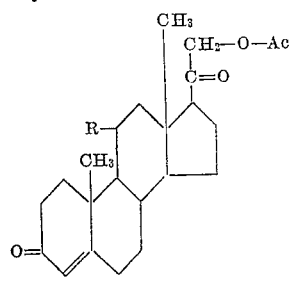

17. The process of claim 16 wherein R is β-hydroxy.
18. The process of claim 16 wherein R is hydrogen.
19. The process of claim 16 wherein R is ketonic oxygen.

20. The process which comprises the steps of (1) condensing 11-ketoprogesterone with at least two molar equivalents each of an alkali-metal alkoxide and diethyl oxalate to produce an alkili-metal dienolate of 2,21-diethoxyoxalyl-11-ketoprogesterone, (2) iodinating the thus-produced diglyoxalate with iodine to produce 2,21-diethoxyoxalyl-21-iodo-11-ketoprogesterone, (3) reacting the thus-produced 21-iodo compound with an alkali-metal acetate to produce 2-ethoxyoxalyl-11-keto-21-acetoxyprogesterone, (4) brominating the 21-acetoxy compound with bromine to produce 2-bromo-2-ethoxyoxalyl-11-keto-21-acetoxyprogersterone, (5) reacting the 2-bromo-2-ethoxyoxalyl compound with an alkali-metal alkoxide to produce 2-bromo-11-keto-21-acetoxyprogesterone and (6) dehalogenating the 2-bromo compound to produce 11-keto-21-acetoxyprogesterone.

References Cited in the file of this patent

UNITED STATES PATENTS

| 2,703,805 | Rosenkranz | Mar. 8, 1955 |
| 2,705,237 | Djerassi | Mar. 29, 1955 |

FOREIGN PATENTS

| 1,056,878 | France | Oct. 28, 1953 |
| 1,058,969 | France | Nov. 10, 1953 |

OTHER REFERENCES

Djerassi: Experientia V, 204 (1949).